UNITED STATES PATENT OFFICE.

DANIEL G. ROLLIN, OF NEW YORK, N. Y.

IMPROVEMENT IN FABRICS FOR CARPET-LINING, &c.

Specification forming part of Letters Patent No. 194,845, dated September 4, 1877; application filed June 14, 1877.

*To all whom it may concern:*

Be it known that I, DANIEL G. ROLLIN, of the city, county, and State of New York, have invented a new and Improved Fabric, of which the following is a specification:

This invention has for its object the production of an improved elastic fabric, which is useful for a great many purposes where a fabric possessing strength and elasticity is required—as, for instance, carpet-lining, insoles for boots and shoes, &c.

My improved fabric is composed of vegetable or animal fibers, or of vegetable and animal fibers combined.

The following is the process I usually employ in the manufacture of the new fabric:

Formula: For making, say, one square yard of the fabric, I usually take about one and a half ounce of cotton-waste, about one-fourth of an ounce of glue made into a sizing, and a sufficient quantity of water to perfectly saturate the fibrous mass. To this I add particles of sponge, cork, raw cotton, or other suitable elastic substance; also, about one-sixteenth of an ounce of alum, acid, or any other astringent.

The cotton-waste should be finely reduced by pickers suitably adapted to the purpose.

The wet mass is passed between wire-cloth aprons and dried, when it is ready for use.

The fabric may be made as thick or thin as required, and it may be composed of more than one layer, with the elastic material between the layers.

I do not confine myself to the use of cotton-waste, as many other refuse substances may be adopted; neither do I confine myself to the precise proportions of the substances herein specified, as they may be varied according to circumstances. For some purposes I shall omit the sponge or any elastic substance.

Having thus fully described my invention, I claim as new and desire to secure by Letters Patent—

An improved fabric composed of cotton-waste, glue-sizing, sponge, cork, and raw cotton, substantially as specified.

DANIEL G. ROLLIN.

Witnesses:
   R. F. CAMPBELL,
   C. SEDGWICK.